US012770362B2

(12) United States Patent
Han et al.

(10) Patent No.: US 12,770,362 B2
(45) Date of Patent: Oct. 20, 2026

(54) IMAGE PROCESSING SYSTEM AND DISPARITY CALCULATION METHOD

(71) Applicant: SK hynix Inc., Icheon-si (KR)

(72) Inventors: Ji Hee Han, Icheon-si (KR); Hun Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 784 days.

(21) Appl. No.: 18/301,018

(22) Filed: Apr. 14, 2023

(65) Prior Publication Data

US 2024/0144645 A1 May 2, 2024

(30) Foreign Application Priority Data

Nov. 2, 2022 (KR) ........................ 10-2022-0144481

(51) Int. Cl.
*G06K 9/00* (2022.01)
*G01C 3/08* (2006.01)
(Continued)

(52) U.S. Cl.
CPC ........... *G06V 10/761* (2022.01); *G01C 3/085* (2013.01); *G06T 7/50* (2017.01); *G06T 7/70* (2017.01);
(Continued)

(58) Field of Classification Search
CPC .. G06T 7/50; G06T 7/55; G06T 7/571; G06T 7/593; G06T 7/70; G06T 7/97; G06T 2207/10004; G06T 2207/10012; G06T 2207/20228; G06V 10/20; G06V 10/761; G06V 2201/12; H04N 13/10; H04N 13/106; H04N 13/122; H04N 13/128; H04N 13/204; H04N 13/207; H04N 13/218; H04N 13/221; H04N 13/236; H04N 13/246; H04N 2013/0074; H04N 2013/0081; H04N 23/54; H04N 23/55; H04N 23/67; H04N 23/675; H04N 23/676; G03B 13/36; G01C 3/085
(Continued)

(56) References Cited

U.S. PATENT DOCUMENTS

| | | | | |
|---|---|---|---|---|
| 2014/0192167 A1* | 7/2014 | Hayashi | H04N 13/296 348/49 |
| 2017/0150019 A1* | 5/2017 | Kyung | H04N 23/125 |
| 2020/0260029 A1* | 8/2020 | Kang | H04N 17/002 |

FOREIGN PATENT DOCUMENTS

| | | | |
|---|---|---|---|
| KR | 1020160099948 | A | 8/2016 |
| KR | 1020200097865 | A | 8/2020 |
| KR | 1020210133083 | A | 11/2021 |

* cited by examiner

*Primary Examiner* — Eric Rush
(74) *Attorney, Agent, or Firm* — WILLIAM PARK AND ASSOCIATES LTD.

(57) ABSTRACT

Provided is an image processing system and a disparity calculation method. An image processing device included in the image processing system includes a preprocessor configured to determine an effective range of a focal length of an image sensor based on first disparities measured at a plurality of focal lengths of an object having a fixed position from the image sensor, and determine a representative value of equivalent aperture values for the image sensor corresponding to the effective range based on the first disparities. The image processing device also includes a disparity calculator configured to calculate a second disparity of the target object within the effective range based on the focal length, a first distance, a second distance, and the representative value of the equivalent aperture values.

21 Claims, 5 Drawing Sheets

(51) Int. Cl.
*G06T 7/50* (2017.01)
*G06T 7/70* (2017.01)
*G06V 10/74* (2022.01)
*H04N 23/67* (2023.01)

(52) U.S. Cl.
CPC ......... *H04N 23/675* (2023.01); *H04N 23/676* (2023.01); *G06T 2207/20228* (2013.01); *G06V 2201/12* (2022.01)

(58) Field of Classification Search
USPC ....... 382/100, 106, 154, 255, 270–276, 291, 382/302, 307, 312, 325; 348/42, 44, 46, 348/135, 180, 187, 189, 222.1, 335, 345, 348/349, 370; 359/362, 376–379, 462; 356/3, 4.01, 4.02, 4.03, 4.05, 614, 624; 396/72, 75–77, 89, 91, 377, 661
See application file for complete search history.

IMAGE PROCESSING SYSTEM AND DISPARITY CALCULATION METHOD

CROSS-REFERENCE TO RELATED APPLICATION

The present application claims priority under 35 U.S.C. § 119(a) to Korean patent application number 10-2022-0144481, filed on Nov. 2, 2022, in the Korean Intellectual Property Office, the entire disclosure of which is incorporated herein by reference.

BACKGROUND

1. Technical Field

Various embodiments of the present disclosure generally relate to an image processing system, and more particularly to an image processing system and a disparity calculation method.

2. Related Art

Generally, image sensors may be classified as charge coupled device (CCD) image sensors or complementary metal oxide semiconductor (CMOS) image sensors. Recently, the CMOS image sensor, which has low manufacturing cost, has low power consumption, and facilitates integration with a peripheral circuit, has attracted attention.

An image sensor included in a smartphone, a tablet PC, or a digital camera may acquire image data of an external object by converting light reflected from the external object into an electrical signal. The image sensor may generate image data including phase information.

An image signal processing device may calculate disparities based on the acquired image data. However, because an operation of calculating disparities using all image data may be a burden on hardware, there is need of a method of efficiently and accurately calculating disparities using a theoretical model.

SUMMARY

Various embodiments of the present disclosure are directed to an image processing system and a disparity calculation method, which determine an effective range for the focal length of a theoretical model for calculating disparities and a representative value of equivalent aperture values, based on previously acquired disparities, and calculate disparity of a target object using the theoretical model.

Various embodiments of the present disclosure are directed to an image processing device. The image processing device may include a preprocessor configured to determine an effective range of a focal length of an image sensor based on first disparities measured at a plurality of focal lengths of an object having a fixed position from the image sensor, and to determine a representative value of equivalent aperture values for the image sensor corresponding to the effective range based on the first disparities. The image processing device may also include a disparity calculator configured to calculate a second disparity of the target object within the effective range based on the focal length of the image sensor, a first distance, which is an actual distance from the image sensor to the target object, a second distance, which is a distance from the image sensor to a virtual best focal position of the target object, and the representative value of the equivalent aperture values.

An embodiment of the present disclosure may provide for an image processing system. The image processing system may include an image sensor including a lens and a pixel array, the image sensor configured to change a focal length of the lens and generate image data corresponding to focal lengths of the lens. The image processing system may also include a preprocessor configured to calculate first disparities respectively corresponding to the focal lengths of an object having a fixed position from the image sensor based on the image data, determine an effective range of the focal length of the lens based on the first disparities, and determine a representative value of equivalent aperture values for the lens corresponding to the effective range. The image processing system may further include a disparity calculator configured to calculate a second disparity of the target object within the effective range based on the focal length of the lens, a first distance, which is an actual distance from the lens to a target object, a third distance, which is a distance from the lens to the pixel array, and the representative value of the equivalent aperture values.

The present disclosure may provide for a disparity calculation method performed by an image processing device including an image sensor. The disparity calculation method may include: determining an effective range of a focal length of the image sensor based on first disparities measured at a plurality of focal lengths of an object having a fixed position from the image sensor; determining a representative value of equivalent aperture values for the image sensor corresponding to the effective range based on the first disparities; and calculating a second disparity of the target object within the effective range based on the focal length of the image sensor, a first distance, which is an actual distance from the image sensor to the target object, and the representative value of the equivalent aperture values.

DETAILED DESCRIPTION

Specific structural or functional descriptions in the embodiments of the present disclosure introduced in this specification or application are provided as examples to describe embodiments according to the concept of the present disclosure. The embodiments according to the concept of the present disclosure may be practiced in various forms, and should not be construed as being limited to the embodiments described in the specification or application.

Various embodiments of the present disclosure will now be described more fully hereinafter with reference to the accompanying drawings, in which preferred embodiments of the present disclosure are shown, so that those skilled in the art can practice the technical spirit of the present disclosure.

Figure 1:
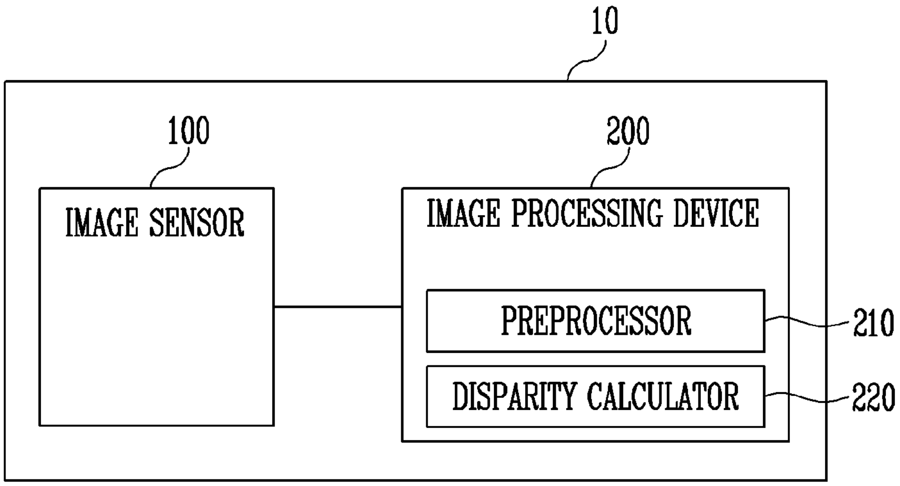
FIG. 1 is a diagram illustrating an image processing system according to an embodiment of the present disclosure.

FIG. 1 is a diagram illustrating an image processing system according to an embodiment of the present disclosure.

Referring to FIG. 1, an image processing system 10 may include an image sensor 100 and an image processing device 200.

The image processing system 10 according to the embodiment may acquire an image. Further, the image processing system 10 may store or display an output image in which an image is processed, or may output the output image to an external device. The image processing system 10 according to the embodiment may provide the output image to a host in response to a request received from the host.

The image sensor 100 may generate image data of an object that is input through one or more lenses. The one or more lenses may form an optical system.

The image sensor 100 may include a plurality of pixels. The image sensor 100 may generate a plurality of pixel values corresponding to a captured image at the plurality of pixels. In an embodiment of the present disclosure, all pixel values generated by the image sensor 100 may include phase information and brightness information of the image.

The image sensor 100 may transmit the image data including the pixel values to the image processing device 200. In an embodiment of the present disclosure, the image processing device 200 may acquire the phase information and brightness information of the image from the image data.

The image processing device 200 may include a preprocessor 210 and a disparity calculator 220. For some embodiments, one or both of the preprocessor 210 and the disparity calculator 220 are electronic circuits. The image processing device 200 may receive the image data from the image sensor 100. The image data received from the image sensor 100 may include the phase information and brightness information of each of the pixels.

The preprocessor 210 may determine an effective range of the focal length of the image sensor based on disparities measured at a plurality of focal lengths of an object having a fixed position from the image sensor. The preprocessor 210 may determine the representative value of equivalent aperture values for the image sensor corresponding to the effective range based on the disparities.

The preprocessor 210 may calculate equivalent aperture values respectively corresponding to the plurality of focal lengths based on the disparities. The preprocessor 210 may determine the effective range based on the rate of change in the equivalent aperture values.

The preprocessor 210 may allow focal lengths for which the rate of change is less than a preset reference value, among the plurality of focal lengths, to fall within the effective range. The preprocessor 210 may exclude focal lengths for which the rate of change is equal to or greater than the preset reference value from the effective range.

The preprocessor 210 may allow a focal length range having a preset size including a best focal length, among the plurality of focal lengths, to fall within the effective range. Even if the rate of change in the equivalent aperture values is greater than the preset reference value, the preprocessor 210 may allow a certain range, including the best focal length, to fall within the effective range of focal lengths.

The preprocessor 210 may determine the median value of equivalent aperture values calculated at both ends of the effective range of the focal length to be the representative value. In an embodiment of the present disclosure, the preprocessor 210 may determine the average value of equivalent aperture values, calculated at both ends of the effective range of focal lengths, to be the representative value. An equivalent aperture value of a theoretical model which calculates disparities within the effective range of focal lengths may be a single representative value.

The disparity calculator 220 may calculate disparity of the target object within the effective range based on the focal length of the image sensor, a first distance which is an actual distance from the image sensor to the target object, a second distance which is a distance from the image sensor to a virtual best focal position of the target object, and the representative value of equivalent aperture values. In an embodiment of the present disclosure, a disparity calculation theoretical model may include the focal length of the image sensor, the first distance which is an actual distance from the image sensor to the target object, the second distance which is a distance from the image sensor to the virtual best focal position of the target object, and the representative value of equivalent aperture values. The disparity calculator 220 may calculate, as the disparity of the target object, a value obtained by dividing a multiplication product of the difference between the first distance and the second distance and the square of the focal length by a multiplication product of the difference between the second distance and the focal length, the representative value, and the first distance.

In an embodiment of the present disclosure, the disparity calculation theoretical model may include the focal length of the lens, the first distance which is an actual distance from the image sensor to the target object, a third distance which is a distance from the lens included in the image sensor to the pixel array, and the representative value of equivalent aperture values. The disparity calculator 220 may calculate, as the disparity of the target object, a multiplication product of a value, which is obtained by dividing the square of the focal length by a multiplication product of the representative value and a distance between pixels (pixel pitch), and a value, which is obtained by subtracting the sum of the reciprocal of the first distance and the reciprocal of the third distance from the reciprocal of the focal length.

In an embodiment of the present disclosure, the image sensor 100 may include a lens and a pixel array. The image sensor 100 may change the focal length of the lens. The image sensor 100 may generate image data corresponding to the changed focal lengths of the lens.

The preprocessor 210 may calculate disparities respectively corresponding to the focal lengths of an object having a fixed position from the lens based on the image data. The preprocessor 210 may determine the effective range of the focal length of the lens and the representative value of equivalent aperture values for the lens corresponding to the effective range based on the disparities.

The image data may be image data of the object at a uniform distance from the lens. The image sensor may include micro-lenses between the lens and the pixel array.

Each of the micro-lenses may correspond to a preset number of pixels, among the pixels included in the pixel array.

Figure 2:
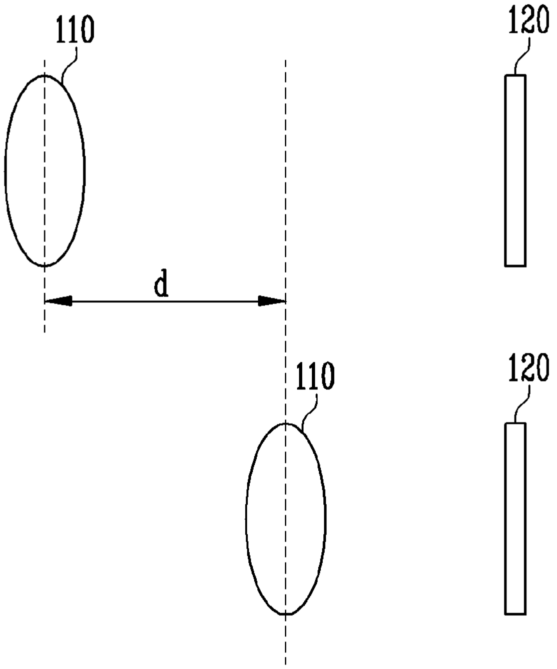
FIG. 2 is a diagram illustrating an image sensor of FIG. 1 according to an embodiment of the present disclosure.

FIG. 2 is a diagram illustrating the image sensor 100 of FIG. 1 according to an embodiment of the present disclosure.

Referring to FIG. 2, the image sensor 100 may include a lens 110 and a pixel array 120. The lens 110 may be coupled to a motor which changes the focal length of the lens 110. In response to the operation of the motor, the position of the lens 110 may be changed. In an embodiment of the present disclosure, the lens 110 may be moved by a distance d depending on a change in the focal length.

The lens 110 may be moved within the image sensor 100. The movement distance d of the lens 110 may be represented by the unit of a micrometer. The focal length of the lens 110 may be changed by the position of the lens and devices coupled to the lens. The focal length of the lens 110 may be changed within a range from a minimum focal length to infinity. In an embodiment of the present disclosure, the minimum focal length may be a focal length for macrophotography.

In an embodiment of the present disclosure, the image sensor 100 may generate image data while moving the lens 110 at regular intervals. The image sensor 100 may generate image data corresponding to a plurality of focal lengths of the lens 110.

The image processing device 200 may measure respective disparities corresponding to the plurality of focal lengths based on the image data corresponding to the plurality of focal lengths. The disparities may be measured for respective pixels. The image processing device 200 may set representative disparities respectively corresponding to the plurality of focal lengths.

The image processing device 200 may measure disparities for a region of interest having a preset size. The image processing device 200 may set the position of the region of interest to the center of the image. The image processing device 200 may determine the average of disparities corresponding to respective pixels included in the region of interest as a representative disparity.

The image processing device 200 may include memory which stores representative disparities. The image processing device 200 may determine a focal length having the lowest representative disparity, among the plurality of focal lengths, to be a best focal length.

In an embodiment of the present disclosure, the pixel array 120 may include a plurality of pixels arranged in a row direction and a column direction. The pixel array 120 may generate a plurality of pixel signals for respective rows.

In detail, the plurality of pixels may accumulate photocharges generated depending on incident light and may generate pixel signals corresponding to the accumulated photocharges. Each of the pixels may include a photoelectric conversion element (e.g., a photodiode, a phototransistor, a photogate, or a pinned photodiode) for converting an optical signal into an electrical signal and at least one transistor for processing the electrical signal.

Figure 3:
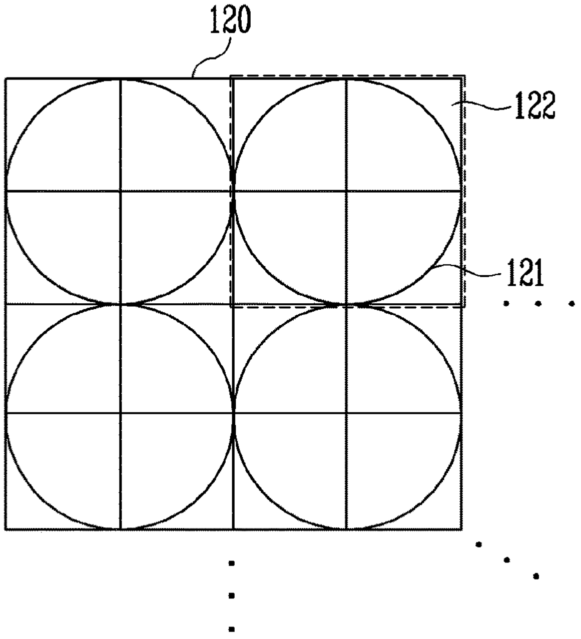
FIG. 3 is a diagram illustrating a pixel array in which four pixel values correspond to one micro-lens according to an embodiment of the present disclosure.

FIG. 3 is a diagram illustrating a pixel array 120 in which four pixel values correspond to one micro-lens according to an embodiment of the present disclosure.

Referring to FIG. 3, micro-lenses for transferring light received from an external system to pixels may be illustrated. The plurality of micro-lenses may be disposed in an upper portion of the pixel array 120. A plurality of pixels may correspond to one micro-lens 121. FIG. 3 illustrates the case where four pixels 122 correspond to one micro-lens by way of example. In FIG. 3, all of four adjacent pixels 122 may correspond to one micro-lens 121.

In FIG. 3, 16 pixels may correspond to four micro-lenses. Because light received from one micro-lens 121 is incident on the four pixels 122, pixel values of the pixels 122 may include phase information.

Embodiments of the present disclosure are not limited to four pixels corresponding to one micro-lens. The number of pixels corresponding to one micro-lens may be variously set. Each of the micro-lenses may correspond to a preset number of pixels, wherein the preset number may be the square of an integer n equal to or greater than 2. For example, four, nine, or sixteen pixels may correspond to one micro-lens.

In an embodiment of the present disclosure, the image sensor may be configured such that all pixels generate pixel values including information about phases. In FIG. 3, phase information included in pixel values may differ from each other depending on the difference between the positions of four pixels 122 corresponding to the same micro-lens. An object included in the four pixels 122 corresponding to the same micro-lens illustrates information about different phases depending on the difference in the position of the object by way of example. In an embodiment of the present disclosure, disparities may be derived based on the difference between the pieces of phase information included in four pixel values.

Figure 4:
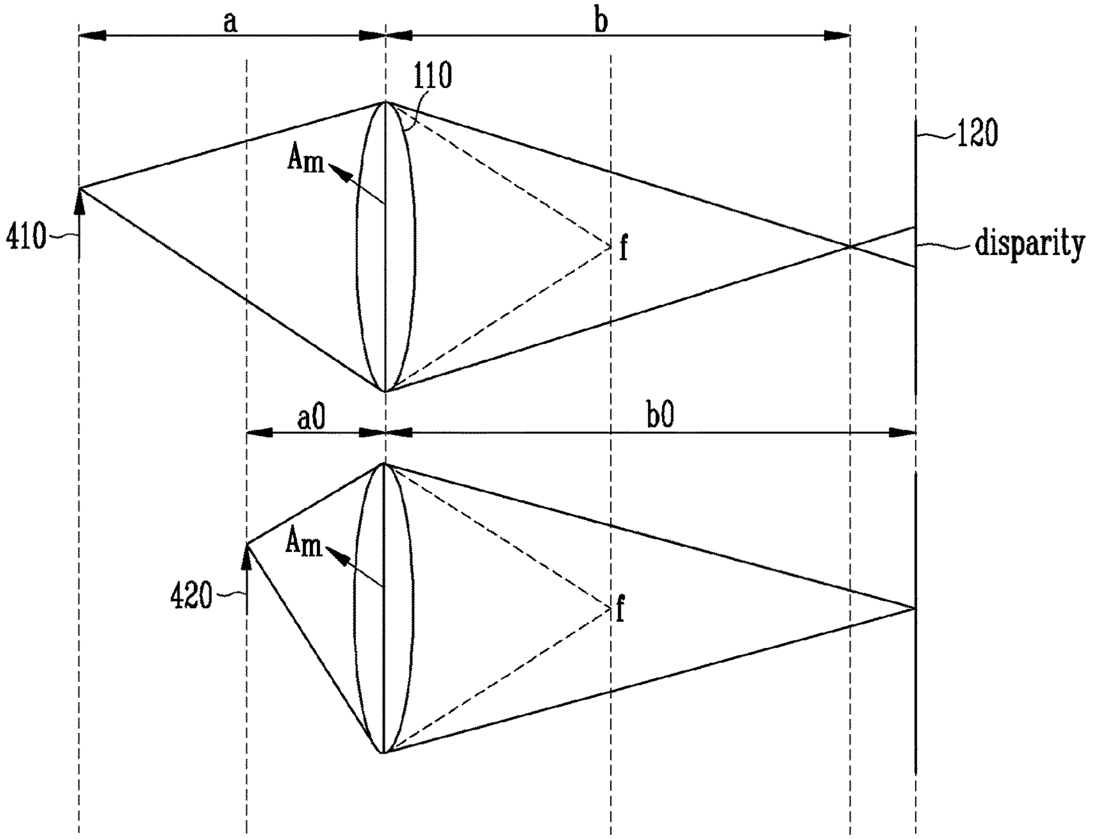
FIG. 4 is a diagram illustrating a disparity calculation model according to an embodiment of the present disclosure.

FIG. 4 is a diagram illustrating a disparity calculation model according to an embodiment of the present disclosure.

Referring to FIG. 4, a preprocessor, for example, the preprocessor 210 of FIG. 1, may generate a disparity calculation model. The preprocessor may acquire information required for the disparity calculation model using disparities measured at a plurality of focal lengths for the object having a fixed position.

The preprocessor may measure disparities for an object 410 having a fixed position from a lens 110. The preprocessor may change the focal length f of the lens 110 and may measure disparities at the plurality of focal lengths. In response to the change in the focal length, the disparities may be changed. The pixel array 120 may generate image data about the object 410.

The position of the object 410 and the image sensor 100 may be fixed, and the image processing device 200 may measure disparities depending on the change in the focal length of the lens 110. Because the change in the focal length of the lens 110 is limited, the position of the pixel array 120 may be different from the best focal position of the lens 110. The preprocessor may assume a virtual object 420 corresponding to the best focal position of the lens 110. An image of the virtual object 420 may have a disparity of 0.

In FIG. 4, 'a' may be a first distance which is a distance between the lens 110 and the object 410, 'a0' may be a second distance which is a distance between the lens 110 and the virtual object 420, 'b0' may be a third distance which is a distance between the lens 110 and the pixel array 120, and 'b' may be a best focal position corresponding to the focal length f of the lens 110.

A lens equation of FIG. 4 is as follows.

$$\frac{1}{a}+\frac{1}{b}=\frac{1}{f}$$

$$\frac{1}{a0}+\frac{1}{b0}=\frac{1}{f}$$

In FIG. 4, a triangulation equation is as follows.

$$b0-b:b=\text{disparity}:Am$$

An aperture constant Am denotes the amount of light incident on the lens. For example, as the aperture constant Am is larger, the amount of light incident on the lens may be smaller. A relationship between the equivalent aperture value for the lens and the aperture constant Am is as follows.

$$Feq \propto \frac{1}{Am}$$

A disparity calculation model generated based on the lens equation and the triangulation equation is as follows.

$$\text{disparity} = Am\cdot\frac{f^2a0(a-a0)}{\alpha(a0-f)^2} \cong Am\cdot\frac{f^2(a-a0)}{a(a0-f)} = \frac{1}{Feq}\cdot\frac{f^2(a-a0)}{a(a0-f)}$$

The preprocessor may calculate equivalent aperture values Feq respectively corresponding to a plurality of focal lengths of the object 410 using the disparities measured at the plurality of focal lengths. The preprocessor may determine the effective range, among the plurality of focal lengths, based on the equivalent aperture values Feq.

In an embodiment of the present disclosure, each equivalent aperture value Feq may be a value indicating the ratio of the focal length of the lens 110 to the effective diameter of the lens 110. The equivalent aperture value Feq may be information about the ratio of the focal length of the lens 110 to the amount of light passing through the lens 110. As the amount of light passing through the lens 110 is larger, the magnitude of the equivalent aperture value Feq may be smaller.

Figure 5:
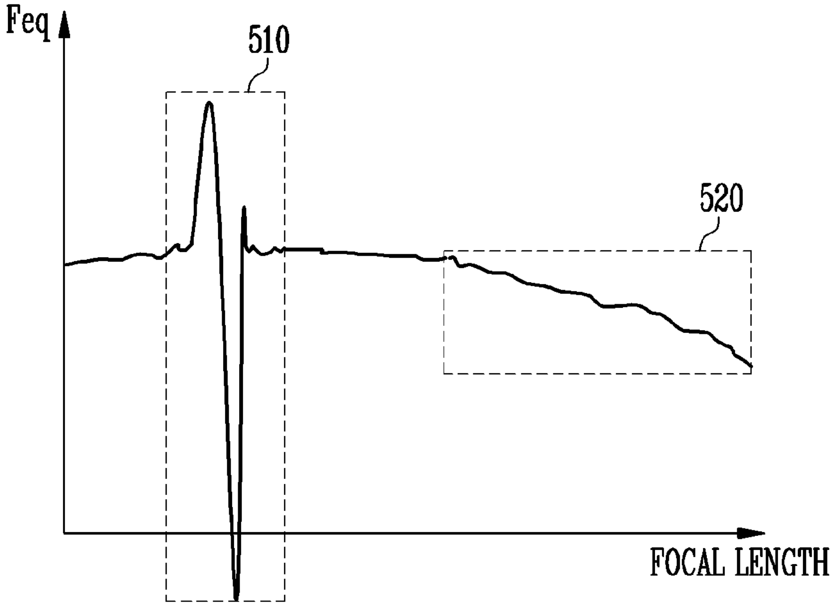
FIG. 5 is a diagram illustrating an effective range of the focal length of an image sensor according to an embodiment of the present disclosure.

FIG. 5 is a diagram illustrating an effective range of the focal length of an image sensor according to an embodiment of the present disclosure.

Referring to FIG. 5, the preprocessor may determine the effective range of the focal length of the image sensor. FIG. 5 is a graph in which equivalent aperture values Feq for focal lengths of the lens are depicted. A horizontal axis denotes the focal lengths of the lens, and a vertical axis denotes the equivalent aperture values Feq.

The preprocessor may determine the effective range of focal lengths based on the rate of change in the equivalent aperture values Feq. The preprocessor may allow focal lengths for which the rate of change in the equivalent aperture values Feq is less than a preset reference value, among the plurality of focal lengths, to fall within the effective range of focal lengths of the lens.

The preprocessor may exclude focal lengths 520, for which the rate of change in equivalent aperture values Feq is equal to or greater than the preset reference value, from the effective range of focal lengths. The preprocessor may allow a best focal length, among the focal lengths excluded from the effective range, and a best focal area 510 of a certain size, which is adjacent to the best focal length, to fall within the effective range.

In an embodiment of the present disclosure, the preprocessor may determine the size of the best focal area 510. The preprocessor may determine the size of the best focal area 510 so that the effective range of focal lengths is continuous. For example, the preprocessor may determine an area between areas of focal lengths for which the rate of change in equivalent aperture values Feq is less than the preset reference value to be the best focal area 510.

Because the disparity value at the best focal length becomes very smaller, the change in the equivalent aperture values Feq may be larger even at small noise. Therefore, even if the rate of change in the equivalent aperture values Feq is equal to or greater than the preset reference value, the best focal area 510 may fall within the effective range of focal lengths.

In an embodiment of the present disclosure, the preprocessor may determine the median value or the mean value of the equivalent aperture values Feq calculated at both ends of the effective range of focal lengths to be a representative value Feq'.

Figure 6:
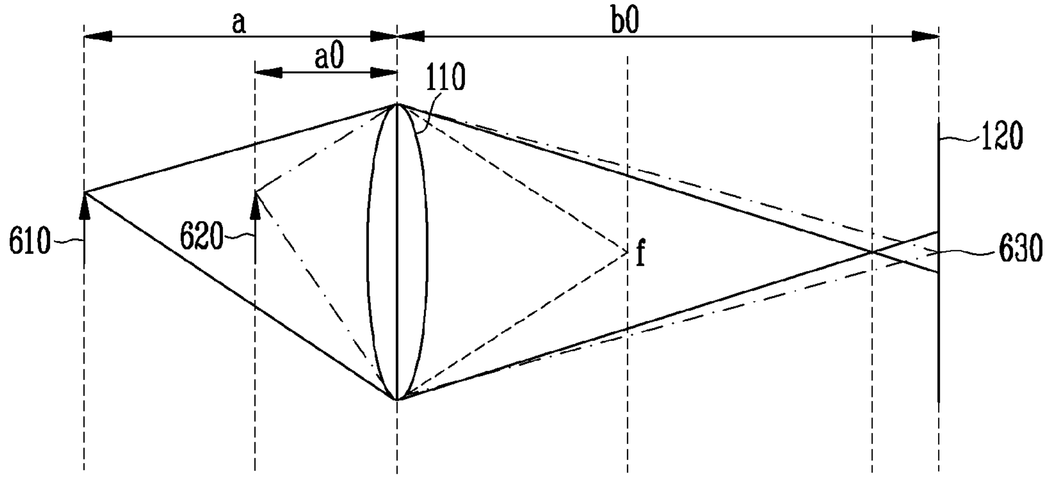
FIG. 6 is a flow diagram illustrating a method of calculating the disparity of a target object according to an embodiment of the present disclosure.

FIG. 6 is a diagram illustrating a method of calculating disparity of a target object according to an embodiment of the present disclosure.

Referring to FIG. 6, a disparity 630 of a target object 610 may be calculated through a theoretical model. A disparity calculator, for example, the disparity calculator 220 of FIG. 1, may calculate the disparity 630 of the target object 610 based on the representative value Feq' of equivalent aperture values Feq for a lens 110.

The disparity calculator may calculate the disparity of the target object within an effective range based on the focal length f of the lens 110, a first distance a which is an actual distance from the lens 110 to the target object 610, a second distance a0 which is a distance from the lens 110 to a virtual best focal position 620 of the target object 610, and the representative value Feq' of the equivalent aperture values Feq. The position of the target object 610 in the case where the best focus of the target object 610 is located at the pixel array 120 may be the virtual best focal position 620 of the target object 610. A theoretical model for calculating the disparity 630 of the target object 610 is as follows.

$$\text{disparity} = \frac{1}{Feq'}\cdot\frac{f^2(a-a0)}{a(a0-f)}$$

When a lens equation is substituted into the theoretical model for calculating the disparity, the theoretical model for calculating the disparity may be represented as follows.

$$\text{disparity} = \frac{f^2}{(Feq' * \text{pixel pitch})}\left(\frac{1}{f}-\frac{1}{b0}-\frac{1}{a}\right)$$

Here, Feq' may be the representative value Feq' of equivalent aperture values Feq for the lens 110, and a pixel pitch is the distance between pixels included in the pixel array 120.

The disparity calculator may calculate the disparity 630 of the target object 610 using the first distance which is the distance between the target object 610 and the lens 110 of FIG. 6 and a third distance b0 which is a distance between the lens 110 and the pixel array 120. In detail, the disparity calculator may calculate, as the disparity 630 of the target object 610, a multiplication product of a value, which is obtained by dividing the square of the focal length f by a multiplication product of the representative value Feq' and the distance between pixels (pixel pitch), and a value, which is obtained by subtracting the sum of the reciprocal of the first distance 1/a and the reciprocal of the third distance 1/b0 from the reciprocal of the focal length 1/f.

In accordance with an embodiment of the present disclosure, the representative value Feq' of the equivalent aperture values Feq may be a uniform constant value even if the focal length is changed within the effective range of focal lengths. The disparity calculator may calculate the disparity 630 of the target object 610 using the theoretical model for calculating disparities without directly measuring the disparity 630. The calculated disparity 630 may have considerably high accuracy. When the theoretical model for calculating disparities is used, a computational load of the image processing device may be reduced.

Figure 7:
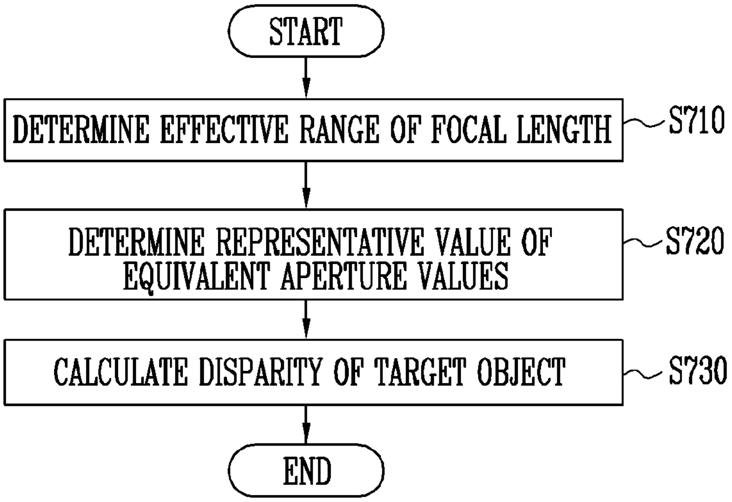
FIG. 7 is a flowchart illustrating a method of calculating the disparity of a target object according to an embodiment of the present disclosure.

FIG. 7 is a flowchart illustrating a method of calculating disparity of a target object according to an embodiment of the present disclosure.

Referring to FIG. 7, the image processing device may calculate the disparity of the target object using a theoretical model without directly measuring the disparity. The image processing device may determine an effective range of focal lengths to which the theoretical model is applicable. The image processing device may create a theoretical model for calculating disparities using disparities of an object having a fixed position.

At step S710, the preprocessor may determine an effective range of the focal length of the image sensor. The preprocessor may determine the effective range of the focal length of the image sensor based on disparities measured at a plurality of focal lengths of an object having a fixed position from the image sensor.

The preprocessor may receive information about disparities respectively corresponding to the plurality of focal lengths. The preprocessor may calculate equivalent aperture values respectively corresponding to the plurality of focal lengths based on the disparities. The preprocessor may determine the effective range based on the rate of change in the equivalent aperture values.

The preprocessor may allow focal lengths for which the rate of change in the equivalent aperture values is less than a preset reference value, among the plurality of focal lengths, to fall within the effective range. The preprocessor may allow a best focal area of a preset size, including a best focal length, to fall within the effective range of focal lengths.

In an embodiment of the present disclosure, the effective range of focal lengths may be continuous. Step S710 may correspond to description of FIGS. 4 and 5.

At step S720, the preprocessor may determine the representative value of equivalent aperture values. The preprocessor may determine the representative value of equivalent aperture values for the image sensor corresponding to the effective range of focal lengths based on the disparities. The preprocessor may calculate equivalent aperture values corresponding to a start point and an end point of the effective range of focal lengths. The preprocessor may determine the average or median value of the calculated equivalent aperture values to be the representative value of equivalent aperture values within the effective range of focal lengths.

At step S730, the disparity calculator may calculate the disparity of the target object within the effective range of focal lengths based on the focal length of the image sensor, a first distance which is an actual distance from the image sensor to the target object, and the representative value of equivalent aperture values. The disparity calculator may skip measurement of the disparity of the target object and may calculate the disparity using a theoretical model.

In an embodiment of the present disclosure, the disparity calculator may calculate a first intermediate value, which is the difference between the first distance and the second distance, which is a distance from the image sensor to the virtual best focal position of the target object. The disparity calculator may calculate a second intermediate value, which is a value obtained by dividing the square of the focal length by a multiplication product of the difference between the second distance and the focal length, the representative value, and the first distance. The disparity calculator may calculate a multiplication product of the first intermediate value and the second intermediate value, as the disparity of the target object.

In an embodiment of the present disclosure, the disparity calculator may calculate a third intermediate value, which is a value obtained by dividing the square of the focal length by a multiplication product of the representative value and the pixel pitch. The disparity calculator may calculate a fourth intermediate value, which is a value obtained by subtracting the sum of the reciprocal of the first distance and the reciprocal of the third distance, which is a distance between the lens and the pixel array which are included in the image sensor, from the reciprocal of the focal length. The disparity calculator may calculate a multiplication product of the third intermediate value and the fourth intermediate value, as the disparity of the target object.

Step S730 may correspond to the description of FIG. 6.

Figure 8:
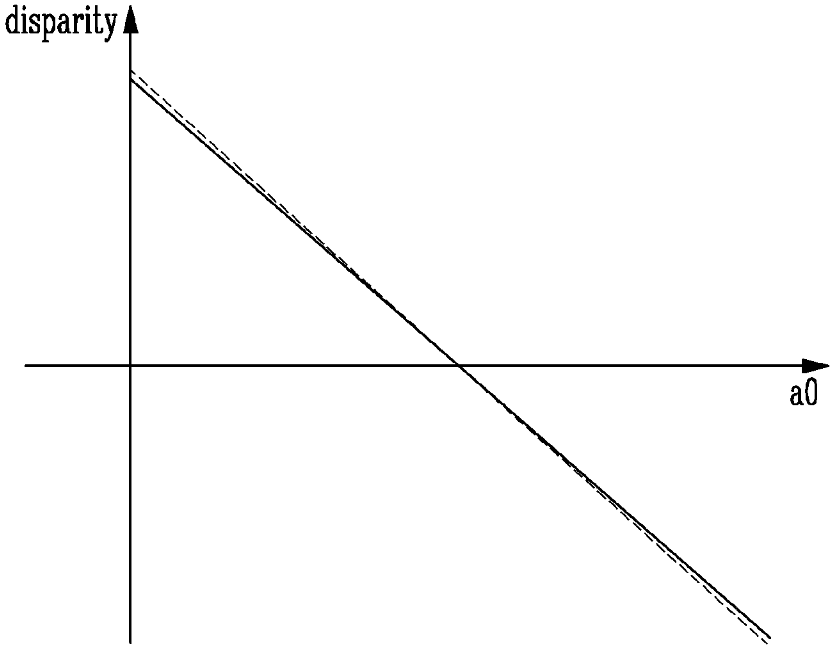
FIG. 8 is a diagram illustrating a comparison between disparity values calculated according to an embodiment of the present disclosure and actual measured disparity values.

FIG. 8 is a diagram illustrating a comparison between disparity values calculated according to an embodiment of the present disclosure and actual measured disparity values.

Referring to FIG. 8, the result of a comparison between a disparity (solid line) calculated using a theoretical model and an actual measured disparity (dotted line), for the same object, is illustrated. The result illustrated in FIG. 8 is the result of the comparison performed under a preset condition, and the result of the comparison may appear variously depending on the set condition.

In FIG. 8, a horizontal axis denotes a second distance, and a vertical axis denotes a disparity. The second distance may denote the virtual position of the object corresponding to the best focal position from the lens of the image sensor. In accordance with a change in the focal length of the lens, the virtual position of the object may change.

When a disparity is 0, the second distance may be equal to the first distance. As the disparity is closer to 0, the difference between the disparity calculated through the theoretical model (indicated by a solid line) and the actual measured disparity (indicated by a dotted line) may be smaller.

In an embodiment of the present disclosure, the disparity calculator may calculate the disparity of the target object using the theoretical model only for some of the focal lengths. The disparities calculated using the theoretical model within the effective range of the focal length may be very similar to the actual measured disparities. The disparity calculator may promptly and accurately calculate disparities using the theoretical model in accordance with the focal lengths falling within a certain effective range.

Figure 9:
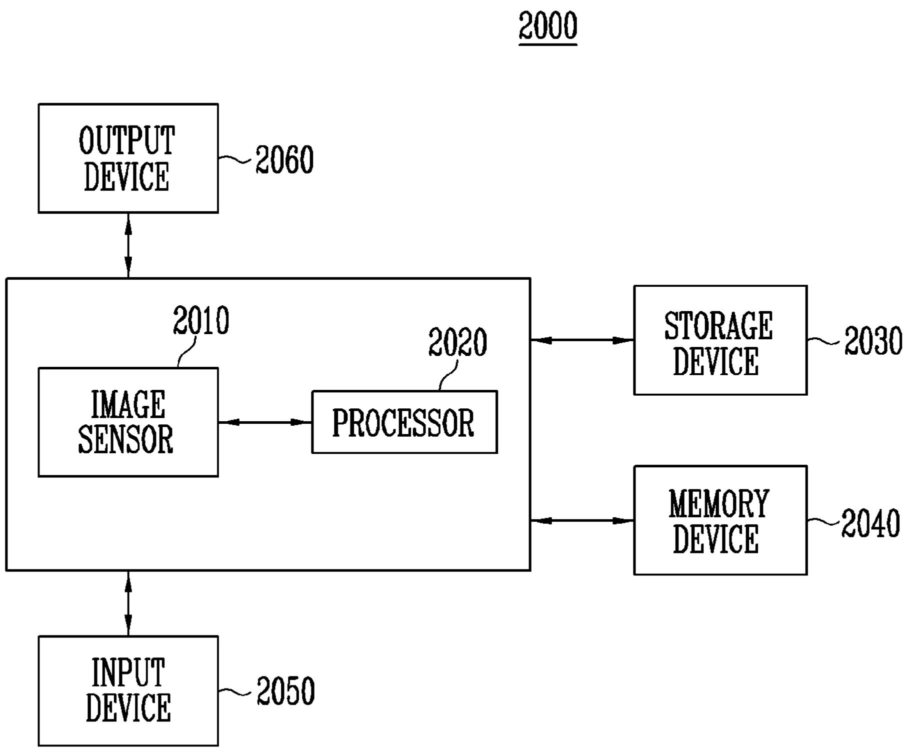
FIG. 9 is a block diagram illustrating an electronic device including an image processing system according to an embodiment of the present disclosure.

FIG. 9 is a block diagram illustrating an electronic device including an image processing system according to an embodiment of the present disclosure.

Referring to FIG. 9, an electronic device 2000 may include an image sensor 2010, a processor 2020, a storage device 2030, a memory device 2040, an input device 2050, and an output device 2060. Although not illustrated in FIG. 9, the electronic device 2000 may further include ports capable of communicating with a video card, a sound card, a memory card, a USB device, or other electronic devices.

The image sensor 2010 may generate image data corresponding to incident light. The image data may be transferred to and processed by the processor 2020. The output device 2060 may display the image data. The storage device 2030 may store the image data. The processor 2020 may control the operations of the image sensor 2010, the output device 2060, and the storage device 2030.

The processor 2020 may be an image processing device which performs an operation of processing the image data received from the image sensor 2010 and outputs the processed image data. Here, processing may include electronic image stabilization (EIS), interpolation, tonal correction, image quality correction, size adjustment, etc.

The processor 2020 may be implemented as a chip independent of the image sensor 2010. For example, the processor 2020 may be implemented as a multi-chip package. In an embodiment of the present disclosure, the processor 2020 and the image sensor 2010 may be integrated into a single chip so that the processor 2020 is included as a part of the image sensor 2010.

The processor 2020 may execute and control the operation of the electronic device 2000. In accordance with an embodiment of the present disclosure, the processor 2020 may be a microprocessor, a central processing unit (CPU), or an application processor (AP). The processor 2020 may be coupled to the storage device 2030, the memory device 2040, the input device 2050, and the output device 2060 through an address bus, a control bus, and a data bus, and may then communicate with the devices.

In an embodiment of the present disclosure, the processor 2020 may create a theoretical model for calculating disparities. The processor 2020 may determine the effective range of focal lengths and the representative value of equivalent aperture values for the theoretical model, based on disparities measured at a plurality of focal lengths of an object having a fixed position. The processor 2020 may calculate the disparity of the target object using the theoretical model based on the focal length of an image sensor, an actual distance from the image sensor to a target object, and the representative value of the equivalent aperture values.

The storage device 2030 may include all types of nonvolatile memory devices including a flash memory device, a solid-state drive (SSD), a hard disk drive (HDD), and a CD-ROM.

The memory device 2040 may store data required for the operation of the electronic device 2000. For example, the memory device 2040 may include volatile memory such as a dynamic random-access memory (DRAM) or a static random access memory (SRAM), or may include nonvolatile memory such as erasable programmable read-only memory (EPROM), electrically erasable programmable read-only memory (EEPROM), or flash memory. The processor 2020 may control the image sensor 2010 and the output device 2060 by executing an instruction set stored in the memory device 2040.

The input device 2050 may include an input means such as a keyboard, a keypad, or a mouse, and the output device 2060 may include an output means such as a printer device or a display.

The image sensor 2010 may be implemented as various types of packages. For example, at least some components of the image sensor 2010 may be implemented using any of packages such as package on package (PoP), ball grid arrays (BGAs), chip scale packages (CSPs), plastic leaded chip carrier (PLCC), plastic dual in line package (PDIP), die in waffle pack, die in wafer form, chip on board (COB), ceramic dual in line package (CERDIP), plastic metric quad flat pack (MQFP), thin quad flatpack (TQFP), small outline integrated circuit (SOIC), shrink small outline package (SSOP), thin small outline package (TSOP), system in package (SIP), multi chip package (MCP), wafer-level fabricated package (WFP), and wafer-level processed stack package (WSP).

Meanwhile, the electronic device 2000 may be construed as any of all computing systems using the image sensor 2010. The electronic device 2000 may be implemented in the form of a packaged module, a part or the like. For example, the electronic device 2000 may be implemented as a digital camera, a mobile device, a smartphone, a personal computer (PC), a tablet PC, a notebook computer, a personal digital assistant (PDA), an enterprise digital assistant (EDA), a portable multimedia player (PMP), a wearable device, a black box, a robot, an autonomous vehicle, or the like.

In accordance with the present disclosure, there may be provided an image processing system, which calculates disparity of a target object within an effective range of a focal length through a theoretical model for calculating disparities.

It should be noted that the scope of the present disclosure is defined by the accompanying claims, rather than by the foregoing detailed descriptions, and all changes or modifications derived from the meaning and scope of the claims and equivalents thereof are included in the scope of the present disclosure.

What is claimed is:

1. An image processing device, comprising:

a preprocessor configured to determine an effective range of a focal length of an image sensor based on first disparities, measured at a plurality of focal lengths, of an object having a fixed position from the image sensor, and to determine a representative value of equivalent aperture values for the image sensor corresponding to the effective range based on the first disparities; and a disparity calculator configured to calculate a second disparity of a target object within the effective range based on the focal length of the image sensor, a first distance, which is an actual distance from the image sensor to the target object, a second distance, which is a distance from the image sensor to a virtual best focal position of the target object, and the representative value of the equivalent aperture values.

2. The image processing device according to claim 1, wherein the preprocessor is configured to calculate the equivalent aperture values respectively corresponding to the plurality of focal lengths based on the first disparities and to determine the effective range based on a rate of change in the equivalent aperture values.

3. The image processing device according to claim 2, wherein the preprocessor is configured to allow a first effective range including focal lengths, for which the rate of change is less than a preset reference value, among the plurality of focal lengths, to fall within the effective range.

4. The image processing device according to claim 3, wherein the preprocessor is configured to allow a second effective range, which is a focal length range of a preset size, including a best focal length among the plurality of focal lengths, to fall within the effective range.

5. The image processing device according to claim 4, wherein the preprocessor is configured to determine a median value or an average value of equivalent aperture values, calculated at both ends of a final effective range including the first effective range and the second effective range, to be the representative value.

6. The image processing device according to claim 5, wherein the disparity calculator is configured to calculate a value, obtained by dividing a multiplication product of a difference between the first distance and the second distance and a square of the focal length by a multiplication product of a difference between the second distance and the focal length, the representative value, and the first distance, as the second disparity of the target object.

7. An image processing system, comprising:

an image sensor including a lens and a pixel array, the image sensor configured to change a focal length of the lens and generate image data corresponding to focal lengths of the lens;

a preprocessor configured to calculate first disparities, respectively corresponding to the focal lengths, of an object having a fixed position from the image sensor based on the image data, determine an effective range of the focal length of the lens based on the first disparities, and determine a representative value of equivalent aperture values for the lens corresponding to the effective range; and a disparity calculator configured to calculate a second disparity of a target object within the effective range based on the focal length of the lens, a first distance, which is an actual distance from the lens to the target object, a third distance, which is a distance from the lens to the pixel array, and the representative value of the equivalent aperture values.

8. The image processing system according to claim 7, wherein:

the image sensor includes micro-lenses between the lens and the pixel array, and each of the micro-lenses corresponds to a preset number of pixels, among pixels included in the pixel array.

9. The image processing system according to claim 8, wherein:

the pixels generate pixel values, each including brightness information and phase information, and the image data includes the pixel values.

10. The image processing system according to claim 7, wherein the preprocessor is configured to calculate the equivalent aperture values respectively corresponding to the focal lengths based on the first disparities and to determine the effective range based on a rate of change in the equivalent aperture values.

11. The image processing system according to claim 10, wherein the preprocessor is configured to allow a subset of focal lengths for which the rate of change is less than a preset reference value, among the focal lengths, to fall within the effective range.

12. The image processing system according to claim 7, wherein the preprocessor is configured to allow a focal length range of a preset size, including a best focal length, among the focal lengths, to fall within the effective range.

13. The image processing system according to claim 7, wherein the preprocessor is configured to determine a median value or an average value of equivalent aperture values, calculated at both ends of the effective range, to be the representative value.

14. The image processing system according to claim 7, wherein the disparity calculator is configured to calculate a multiplication product of a value, which is obtained by dividing a square of the focal length by a multiplication product of the representative value and a distance between pixels included in the pixel array, and a value, which is obtained by subtracting a sum of a reciprocal of the first distance and a reciprocal of the third distance from a reciprocal of the focal length, as the second disparity of the target object.

15. A disparity calculation method performed by an image processing device including an image sensor, the method comprising:

determining an effective range of a focal length of the image sensor based on first disparities, measured at a plurality of focal lengths, of an object having a fixed position from the image sensor;

determining a representative value of equivalent aperture values for the image sensor corresponding to the effective range based on the first disparities; and calculating a second disparity of a target object within the effective range based on the focal length of the image sensor, a first distance, which is an actual distance from the image sensor to the target object, and the representative value of the equivalent aperture values.

16. The disparity calculation method according to claim 15, wherein determining the effective range of the focal length of the image sensor comprises:

calculating the equivalent aperture values respectively corresponding to the plurality of focal lengths based on the first disparities; and determining the effective range based on a rate of change in the equivalent aperture values.

17. The disparity calculation method according to claim 16, wherein determining the effective range comprises:

allowing focal lengths for which the rate of change is less than a preset reference value, among the plurality of focal lengths, to fall within the effective range.

18. The disparity calculation method according to claim 15, wherein determining the effective range comprises:

allowing a focal length range of a preset size including a best focal length, among the plurality of focal lengths, to fall within the effective range.

19. The disparity calculation method according to claim 15, wherein determining the representative value comprises:

determining a median value or an average value of equivalent aperture values, calculated at both ends of the effective range, to be the representative value.

20. The disparity calculation method according to claim 15, wherein calculating the second disparity comprises:

calculating a first intermediate value that is a difference between the first distance and a second distance, which is a distance from the image sensor to a virtual best focal position of the target object;

calculating a second intermediate value that is a value obtained by dividing a square of the focal length by a multiplication product of a difference between the second distance and the focal length, the representative value, and the first distance; and calculating a multiplication product of the first intermediate value and the second intermediate value as the second disparity for the target object.

21. The disparity calculation method according to claim 15, wherein calculating the second disparity comprises:

calculating a third intermediate value that is a value obtained by dividing a square of the focal length by a multiplication product of the representative value and a distance between pixels;

calculating a fourth intermediate value that is a value obtained by subtracting a sum of a reciprocal of the first distance and a reciprocal of a third distance, which is a distance between a lens and a pixel array, included in the image sensor, from a reciprocal of the focal length; and calculating a multiplication product of the third intermediate value and the fourth intermediate value as the second disparity of the target object.

* * * * *